Figure 1A:
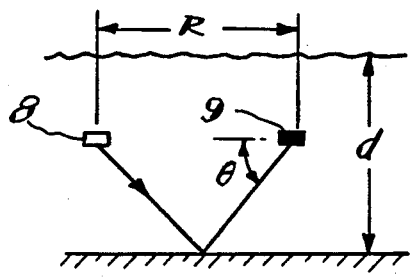

United States Patent [19]

Clearwaters

[11] Patent Number: 5,034,930
[45] Date of Patent: Jul. 23, 1991

[54] PASSIVE RANGING SONAR SYSTEM

[75] Inventor: Walter L. Clearwaters, Quaker Hill, Conn.

[73] Assignee: The United States of America as represented by the Secretary of the Navy, Washington, D.C.

[21] Appl. No.: 525,805

[22] Filed: Feb. 4, 1966

[51] Int. Cl.$^5$ .............................................. G01S 3/80
[52] U.S. Cl. .................................... 367/123; 367/125
[58] Field of Search .................... 340/3, 3 R, 6, 16; 367/118, 124, 125, 115, 123

[56] References Cited

U.S. PATENT DOCUMENTS

| Re. 16,372 | 6/1926 | Fessenden | 367/123 |
|---|---|---|---|
| 1,753,346 | 4/1930 | Lum | 367/123 |
| 1,785,307 | 12/1930 | Hammond, Jr. | 367/117 |
| 2,009,460 | 7/1935 | Turner, Jr. | 367/115 |
| 2,539,001 | 1/1951 | Winchel | 367/115 |
| 2,732,536 | 1/1956 | Miller | 367/159 |
| 2,861,255 | 11/1958 | Mechler et al. | 367/115 |
| 2,940,074 | 6/1960 | Watt | 367/115 |
| 3,094,681 | 6/1963 | Kietz et al. | 367/115 |
| 3,155,937 | 11/1964 | Grimm et al. | 367/124 |
| 3,158,831 | 11/1964 | Boyer | 367/125 |
| 3,182,283 | 5/1965 | Ellingson et al. | 367/125 |
| 3,311,871 | 3/1967 | Baron | 367/123 |

FOREIGN PATENT DOCUMENTS 607361 12/1934 Fed. Rep. of Germany .
934999 11/1955 Fed. Rep. of Germany .

*Primary Examiner*—Daniel T. Pihulic
*Attorney, Agent, or Firm*—Michael J. McGowan; Prithvi C. Lall; Michael F. Oglo

[57] ABSTRACT

A passive acoustic detector including a line hydrophone and apparatus coupled thereto operable to utilize the energy sensed by the elements of the hydrophone during passive listening to effect scanning in depression-elevation by delaying for directivity and then combining acoustic energies sensed by the hydrophone elements and recording the combined energies on an x-y strip recorder for enhanced signal-to-noise ratio.

1 Claim, 5 Drawing Sheets

PASSIVE RANGING SONAR SYSTEM

The invention described herein may be manufactured and used by or for the Government of the United States of America for governmental purposes without the payment of any royalties thereon or therefor.

This invention relates to the interception of waterborne acoustic energy arriving by way of reflection paths and more particularly to passive detection, ranging, and teaching in range by intercepting acoustic energy arriving along reflection paths of propagation and by ascertaining the angle of arrival.

An object of this invention is to take advantage of the bottom and/or surface reflection paths for passive detection, for range approximation, and for tracking in range.

A further object is to measure the vertical angle of arrival of passively detected waterborne acoustic energy.

A further object is to provide a comparatively simple, inexpensive, effective scanning technique for detecting despite interference, enabling fairly accurate range approximation, and for tracking in range an underwater acoustic source.

Other objects and advantages will appear from the following description of an example of the invention, and the novel features will be particularly pointed out in the appended claims.

Figure 1D:
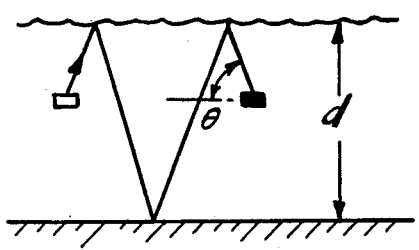
Figure 1B:
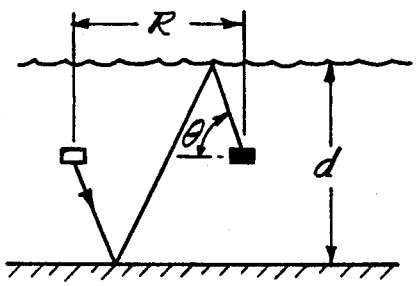
Figure 1E:
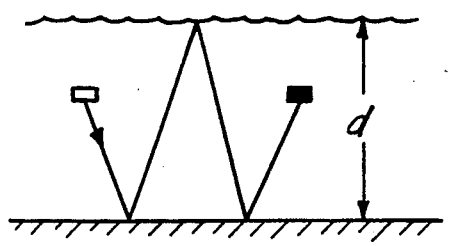
Figure 1C:
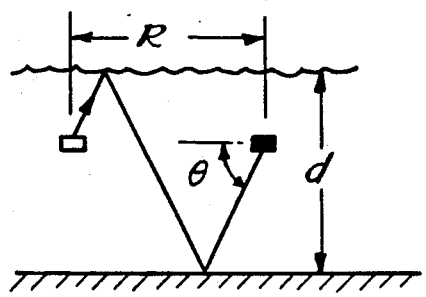
Figure 2:
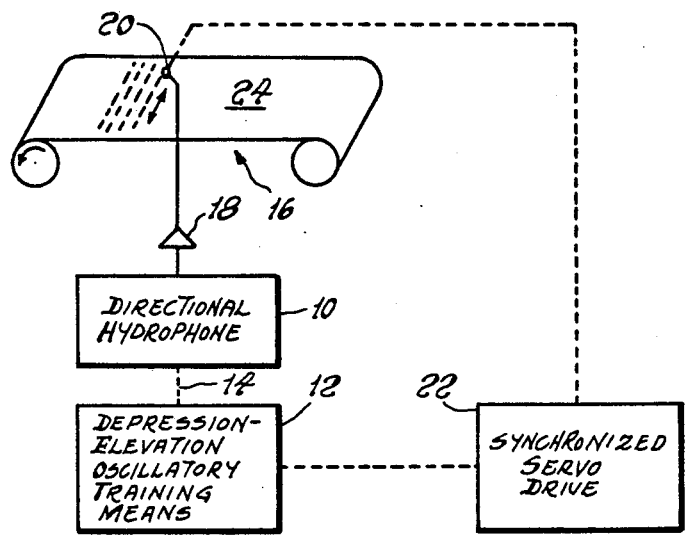
Figure 3:
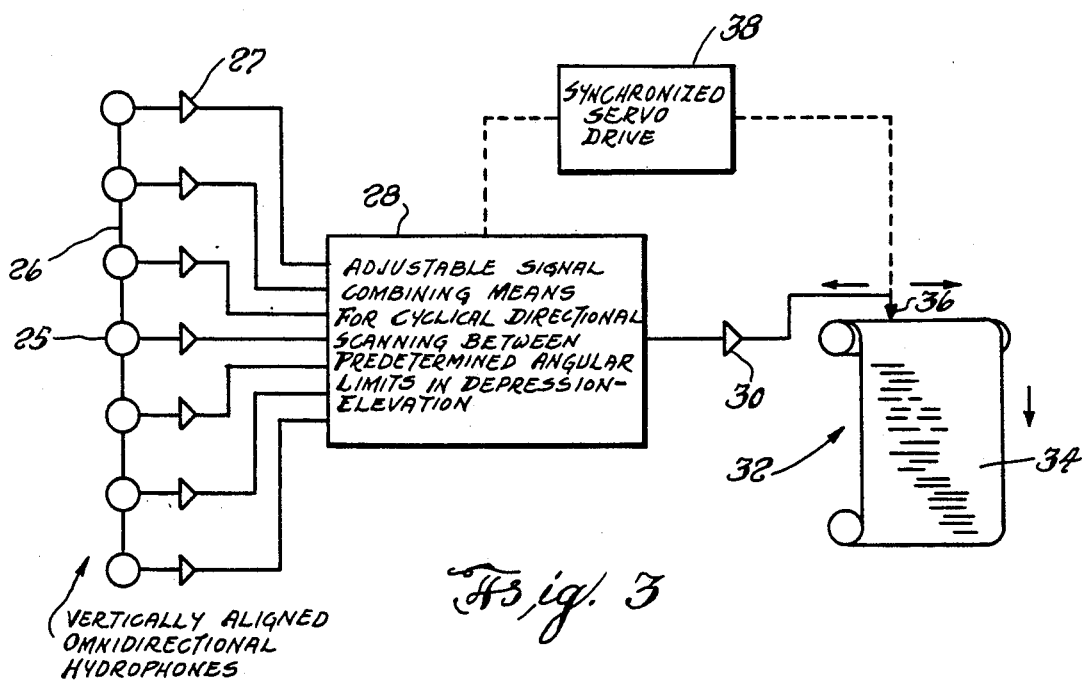
Figure 4:
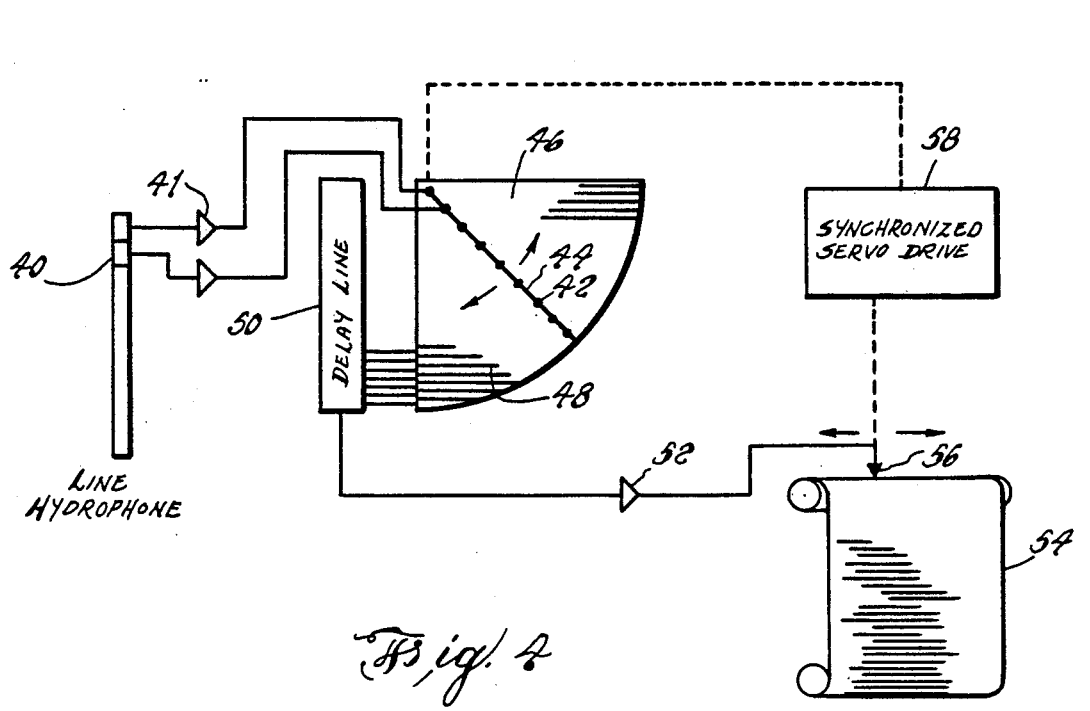
Figure 5:
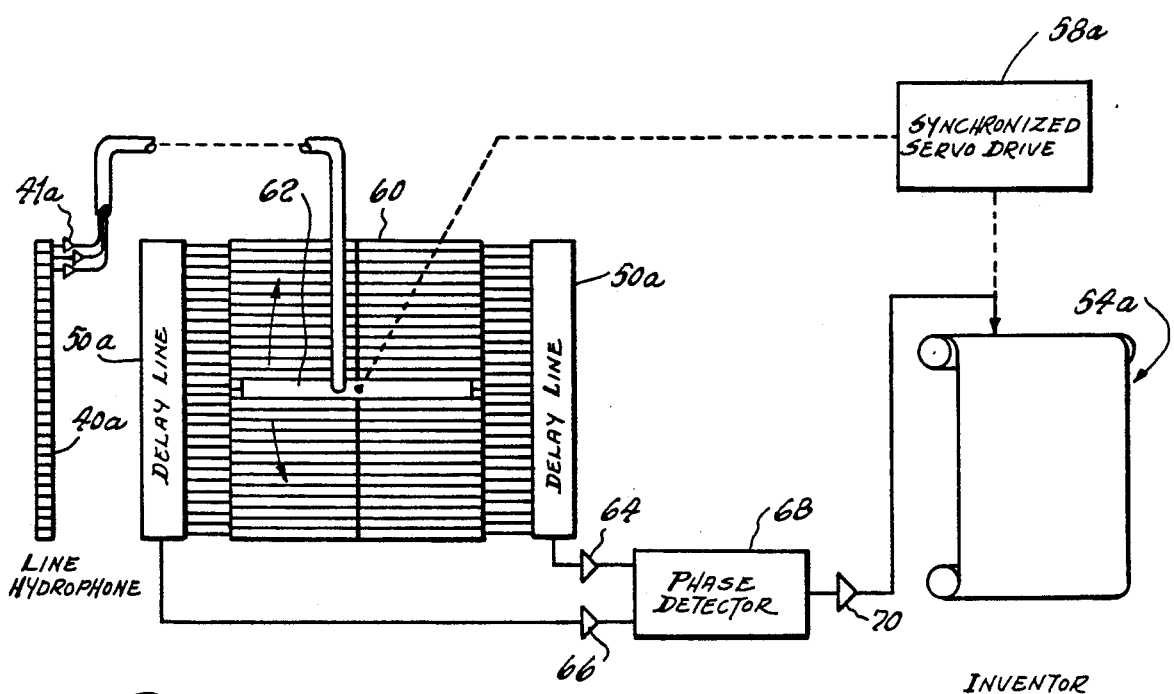
Figure 6:
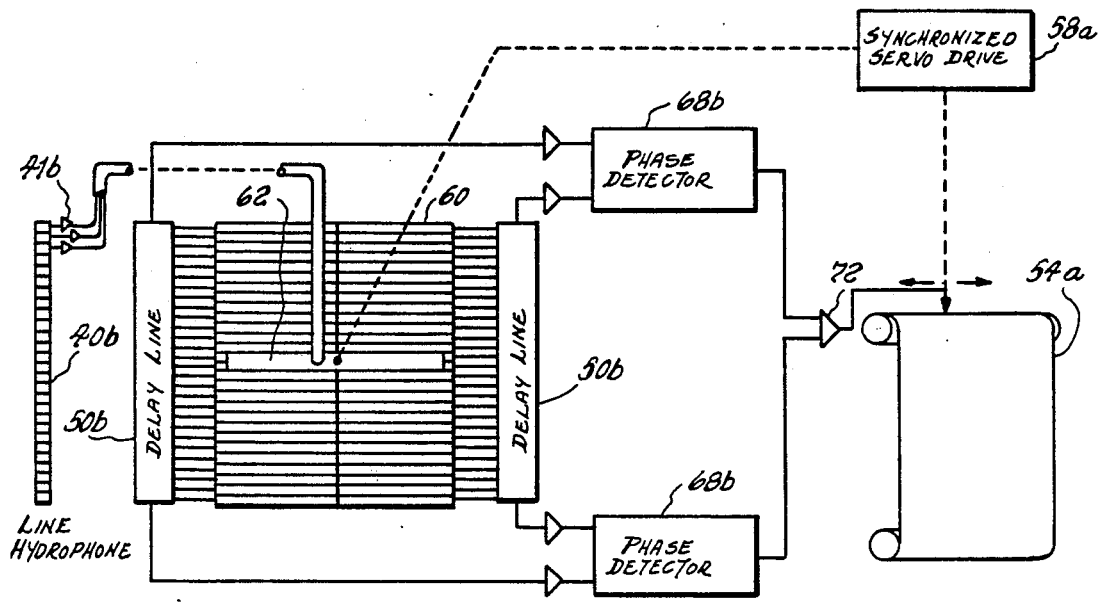
Figure 7:
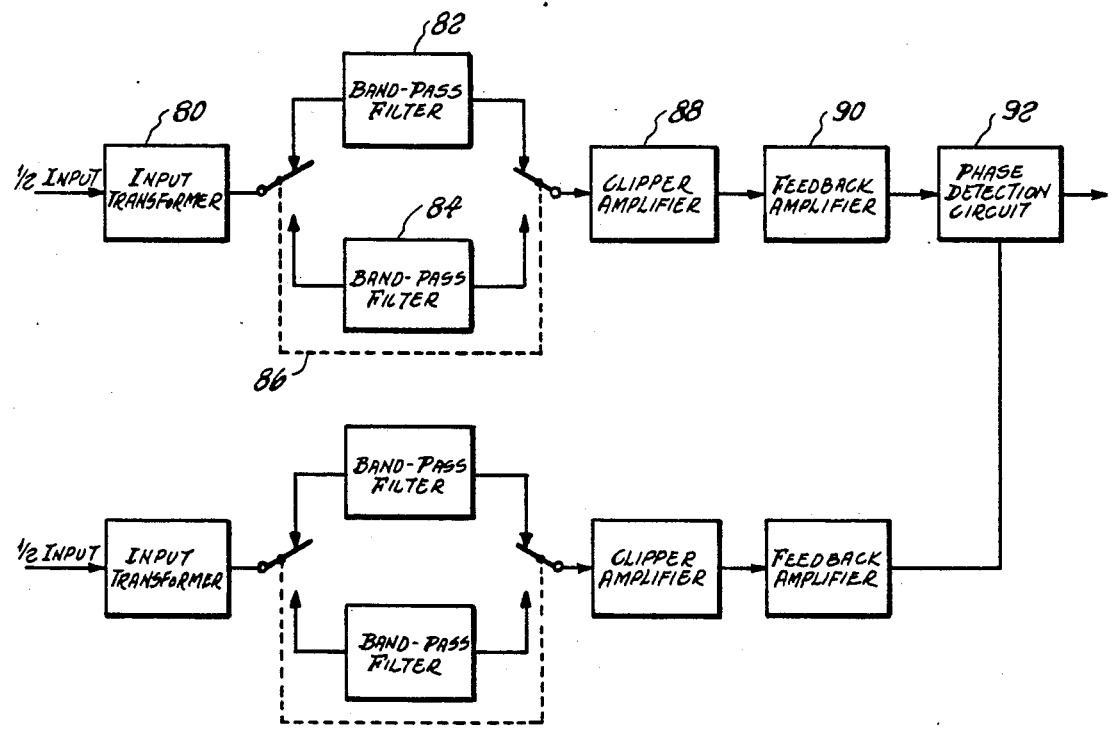
Figure 8:
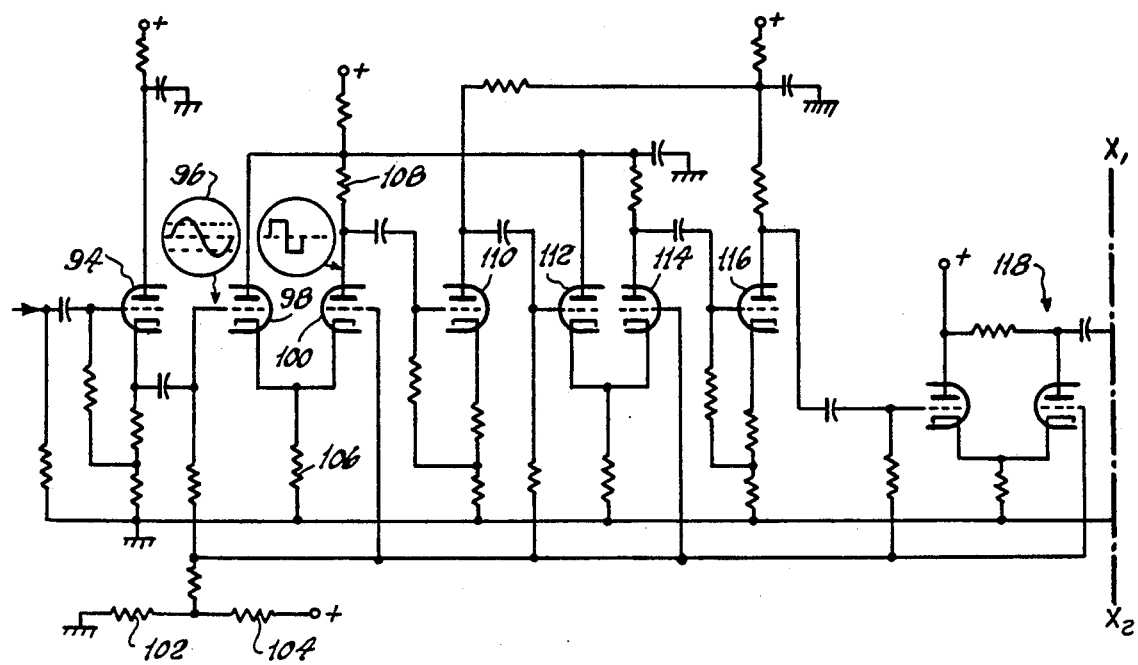
Figure 8:
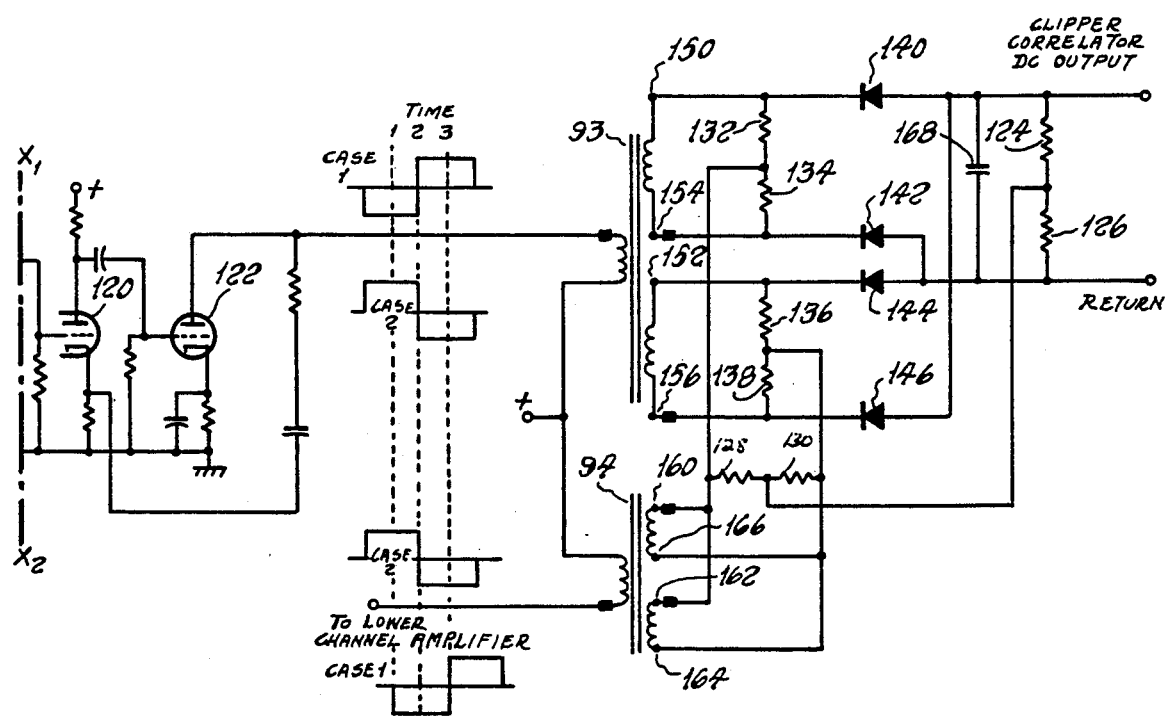

FIGS. 1A thru 1E illustrate various waterborne acoustic ray paths between an acoustic source and a receiver at a distance, FIG. 2 is a functional diagram of one embodiment of the invention illustrating the principles of this invention with an oscillatable directional hydrophone, FIG. 3 is a functional diagram of another embodiment of the invention illustrating the principles of this invention with a non-directional essentially stationary hydrophone means, FIGS. 4 and 5 are functional diagrams of embodiments of the invention, having a line hydrophone, for scanning up to 90 degrees and up to 180 degrees, respectively, in depression-elevation angle, FIG. 6 is a modification of FIG. 5 having two symmetrical beams, FIG. 7 is a block diagram of a clipper-correlator type of phase detector for the embodiments shown in FIGS. 5 and 6, and FIG. 8 is a circuit diagram of a clipper amplifier phase detection circuit shown as blocks in FIG. 7.

FIGS. 1A through 1D show the four ray paths between a submerged acoustic source 8 and receiver 9 involved in single bottom-reflection propagation from the source to the receiver. Each reflection of a ray, particularly each bottom reflection, substantially attenuates the ray. Therefore, of the four paths shown in FIGS. 1A through 1D, the ray path shown in FIG. 1A is of primary importance since only one reflection is involved. By ascertaining signal arrival angle $\theta$ and water depth d, the approximate range R can be determined from $R \sim 2d/\tan \theta$.

If the water depth is large compared to the source and receiver depths, the magnitudes of the arrival angles of the rays shown in FIGS. 1B, 1C, and 1D are approximately the same as that shown in FIG. 1A. Therefore in very deep water all four paths may be used for range determination.

In addition to the single bottom-reflection paths shown in FIGS. 1A-1D, there are other paths involving multiple reflections from the bottom. FIG. 1E shows a ray which encounters three reflections, two from the bottom and one from the surface. As in the single bottom reflection example shown in FIG. 1A, the range can be calculated if the arrival angle can be determined. In general, the signal attenuation in multiple bottom reflections relegates multiple bottom reflection ray paths to relative insignificance.

In obtaining range from measurement of signal arrival angle, several main sources of error that appear to affect range accuracy are: velocity structure of the water, slope of the bottom where the ray is reflected, unknown target depth, own ships variation from horizontal, and measuring equipment resolution. The effect of all these errors taken cumulatively is not significant enough to lessen the utility of this invention for detection, approximating range and for tracking in range.

The embodiment of the invention illustrated in FIG. 2 includes a directional hydrophone 10, training means 12 joined to the hydrophone by mechanical linkage 14 for oscillating the directional hydrophone between predetermined angular limits about a horizontal axis at a rate on the order of one cycle per minute. Acoustic energy detected by the directional hydrophone is coupled to a recorder 16 by an amplifier 18 which includes means for circumscribing a selected frequency band. The recorder includes a writing element 20 reciprocable along a linear path. Synchronized servo drive means 22 displaces the writing element between its limits at the same rate as it angularly displaces the hydrophone 10 between its angular limits. The writing element marks the recording paper 24 when signals exceeding a predetermined amplitude are transmitted thereto. The recording paper is transported either stepwise or at a constant rate transverse to the path of the writing element 20 at a rate such that adjacent tracks of the writing element across the recording paper are closely spaced.

Another embodiment of the invention shown in FIG. 3 includes a series of identical, vertically in-line, equally-spaced, essentially omnidirectional hydrophones 25 rigidly joined by any suitable framework 26. Identical amplifier means 27 are coupled to the outputs of the hydrophones. The amplifier means 27 include any conventional arrangement for circumscribing a selected frequency band or a plurality of frequency bands and may include a conventional band selection arrangement, not shown. A signal combining means 28 is coupled to the outputs of all the amplifier means 27 for combining the signals deriving from the hydrophones and repetitively or cyclically adjustable for directive scanning between predetermined angular limits in depression-elevation. The signal combining means 28 introduces no directionality in azimuth; it introduces directionality in depression-elevation only and sweeps this directionality between predetermined angular limits in depression-elevation. An amplifier 30 couples the output of the signal combining means to a recorder 32. The recorder includes record paper 34 that is displaced linearly in steps or at a constant rate and a writing element 36 that is reciprocable transverse to the displacement direction of the record paper 34 and marks the record paper 34 when signal energy from the amplifier 30 exceeds a predetermined intensity. Sychronized servo drive 38 is mechanically coupled to the writing element 36 and to directionality adjustment elements in the signal combining means 28 whereby the writing element 36 tracks the beam directionality in depression-elevation. The recorder integrates, in effect, signals from a source of continuing acoustic energy in the selected frequency band as compared to noise impulses. An operating vessel is readily detected from the recording. By calibrating the transverse dimension of the record paper 34 in depression-elevation angle of the scan directionality, the approximate arrival angle of the detected acoustic energy and change in the arrival angle is ascertainable from the record element. From the arrival angle and the depth of the water at the hydrophones, a good approximation of range and range rate is obtained from trigonometric computation. The illustrated embodiments can be used for arrival angles from 90 degrees in elevation to 90 degrees in depression.

Another embodiment of the invention shown in FIG. 4 includes a line hydrophone 40 which is an assembly of a series of identical non-directional ring-shaped electro-acoustic elements supported rigidly in line generally as shown in U.S. Pat. No. 2,732,536. The outputs of the hydrophone elements are separately coupled by amplifiers 41 to respective wiper brushes 42 of an in-line set of wiper brushes which are joined in a rigid assembly 44, insulated from one another. The number of brushes is equal to the number of hydrophone elements. The brush assembly 44 is oscillatable about one end thereof. The brushes are in wiping engagement with a face 46 of a compensator assembly of rigidly supported parallel conductor elements 48 insulated from each other. The number of conductor elements is equal to the number of hydrophone elements. The conductor elements are connected to equal time delay terminals of a delay line 50. The number of delay line terminals is equal to the number of hydrophone elements. The output of the delay line is coupled by an amplifier 52 to a recorder 54 having a writing element 56 as in the embodiment in FIG. 2. A synchronized servo drive 58 reciprocates the writing element 56 and accurately oscillates the brush assembly 44 about its upper end in FIG. 4 between limits corresponding to zero and 90 degrees depression angles. At zero degrees, the signals from all of the hydrophones are coupled to one conductor and thus to one terminal of the delay line. At 90 degrees, the signals from the hydrophones are coupled to corresponding individual conductors of the compensator assembly and thus to successive individual terminals of the delay line.

FIG. 5 is a modification of the embodiment of FIG. 4 for use in scanning up to 180 degrees in depression-elevation. It includes a line hydrophone 40a, coupling amplifiers 41a, two delay lines 50a, a recorder 54a, and a synchronized servo drive 58a, each of which is the same as the correspondingly numbered elements in FIG. 4. The compensator plate 60 is actually two-identical compensator plates joined in mirror image relationship and insulated from each other. The terminals of each delay line 50a are connected to corresponding conductors of one compensator plate. The wiper contact assembly is essentially the same as in FIG. 4 except that it is centrally journalled about an axis normal to the center of the compensator. Successive hydrophone elements from one end to the other are coupled to successive wiper contacts from one end to the other. Half of the contacts engage each of the mirror image parts of the compensator. In the orientation of the wiper contact assembly shown in FIG. 5, which corresponds to zero depression-elevation angle, all of the wiper contacts engage the center insulator. Conventional brush and ring means, not shown, are included between the wiper contact assembly and the amplifiers 41a if the wiper contact assembly is rotated instead of oscillated. Amplifiers 64 and 66 couple the outputs of the two delay lines to a phase detector circuit 68 preferably of the type known in the art as a clipper-correlator. An amplifier 70 couples the output of the phase detector to the recorder 54a.

FIG. 6 is a modification of the embodiment of FIG. 5 having two phase detectors 68b coupled to opposite ends of the delay lines. The outputs of the phase detectors are coupled to recorder by an amplifier 72. This arrangement operates to form two vertical listening beams symmetrical about a plane through the center of the line hydrophone and normal to the hydrophone. The processed signals arriving by way of the bottom and surface reflection paths are added directly at the phase detector circuit outputs.

A clipper correlator as illustrated in FIG. 7 may be used to detect the phase difference between signals from the upper-half and lower-half of the line hydrophone. The correlator includes two similar amplifying channels. Only one of the channels is described.

The signals from one-half the line hydrophone are applied to the primary winding of input transformer 80. The transformer 80 serves as an impedance matching element for coupling the signal to the selected one of a plurality of bandpass filters 82, 84, etc. A selector switch 86 is provided for selecting the bandpass filter. Unwanted frequencies are removed by the filter and the desired signal is applied to clipper amplifier 88. The function of the clipper amplifiers of the two channels is to change the signal waveform to a squared waveform of a predetermined constant amplitude. A feedback amplifier 90 is coupled to the output of clipper amplifier 88 for gain stability. Phase detection circuit 92 provides a D.C. output which is a function of the phase difference between signals from the two halves of the line hydrophone.

One clipper amplifier design is shown in FIG. 8. The signal from the selected bandpass filter is R.C. coupled to the grid of amplifier 94. The output of amplifier 94 shown as a sine wave 96 is R.C. coupled to the grid of tube 98. Tubes 98 and 100 are connected as a common cathode clipper circuit. A voltage divider consisting of resistors 102 and 104 supplies the grids of the clipper amplifier stages with a predetermined positive bias voltage. When there is no signal, this bias voltage causes both tubes 98 and 100 to conduct. Current that flows through cathode resistor 106 develops a bias voltage on both cathodes. This bias voltage controls the conduction of the tubes and limits the current flow through them. This cathode bias voltage cannot exceed the bias voltage supplied by the voltage divider by a predetermined amount which amount is on the order of several volts. The current through the cathode resistor divides equally as it flows through the tubes.

As the signal applied to the grid of tube 98 swings positive, the tube conducts more and the resulting current flow through resistor 106 develops a positive voltage on the cathode of tube 100. As a result of the positive voltage developed on its cathode, tube 100 conducts less and its output rises toward the plate supply voltage. If the signal applied to the grid of tube 98 rises to a positive level so that the flow of current through resistor 106 develops a positive voltage great enough on the cathode of tube 100, the latter is cut off. Output of tube 100 then rides at the plate supply voltage regardless of the amplitude of the signal applied to the grid of tube 98.

As the signal applied to the grid of tube 98 swings negative, tube 98 conducts less and the current flow through resistor 106 is reduced, resulting in the presence of a less positive voltage on the cathode of tube 100. When the signal reaches a certain negative level, tube 98 is cut off, and all the current through resistor 106 flows through tube 100. The maximum current flowing through resistor 108 places the plate of tube 100 at its lower voltage limit. Tube 100 reaches its maximum negative output regardless of the level of the input signal to tube 98, thereby clipping the negative portion of the signal. Low amplitude signals applied to the clipper amplifier stage are amplified but such signals are not clipped unless they drive the plate of the tube 100 past the clipping levels. The output of tube 100 is RC coupled to the grid of amplifier 110. The output of this amplifier is RC coupled to the grid of tube 112, which, with tube 114 forms another common cathode clipper stage. The output of tube 114 is amplified by tube 116 and R.C. coupled to clipper amplifier 118. The output of clipper amplifier 118 is RC coupled to the grid of tube 120, which, with tube 122 forms feedback amplifier 90. A portion of the output is RC coupled to the cathode of tube 120. This degenerative feedback stabilizes the gain of amplifier 90.

Signals from both channel amplifiers are applied to the primary windings of transformers 93 and 94 of the phase detection circuit 92. The two inputs are combined in the transformers and applied to the full wave rectifier network consisting of resistors 124, 126, 128, 130, 132, 134, 136 and 138 and diodes 140, 142, 144 and 146. The d-c output has a linear variance with respect to the difference in phase of the input signals. The circuit configuration is such that a difference of 90 degrees between the input signals produces a zero volt output and, as the difference of the input phases decreases toward zero, the output varies to a maximum.

To understand operation of the circuit a zero output condition is considered first. At time 1 the signal applied to transformer 93 is at its maximum negative level while the signal applied to transformer 94 is zero. The signal applied to the primary winding of transformer 93 is coupled to the secondary windings. Relatively positive voltages developed at terminals 150 and 152 reverse bias diodes 140 and 144. Relatively negative voltages developed at terminals 154 and 156 forward bias diodes 144 and 146. Equal electron current flows through these diodes to the junction of resistors 124 and 126 which are equal in resistance value. Equal voltages developed at the extremities of these resistors leave the output with zero difference in voltage between the output and the return. The return path for the current is provided by the conductor connecting the junction of resistors 124 and 126 with the junction of resistors 128 and 130. At time 2 the signal applied to transformer 93 is zero, while the signal applied to transformer 94 is at its maximum negative level. The signal applied to the primary winding of transformer 94 is coupled to the secondary windings. The relatively positive voltages developed at terminals 164 and 166 are connected to the junction of resistors 136 and 138. This positive voltage is applied through the resistors to reverse bias diodes 144 and 146. Negative voltages present on terminals 160 and 162 of transformer 94 are applied through resistors 132 and 134 to forward bias diodes 140 and 142. Again equal currents flow through these diodes and resistors 124 and 126 to produce zero output. At time 3, the signal applied to transformer 93 is at its maximum positive level, while the signal applied to transformer 94 is zero. The relatively positive voltages developed at terminals 154 and 156 reverse bias diodes 142 and 146. The relatively negative voltages developed at terminals 150 and 152 forward bias diodes 140 and equal electron current flows through resistors 124 and 126 to produce the zero output. At intervals between times 1, 2, and 3, the condition of the diodes change, but as one pair is changing from the forward bias condition, the other pair is undergoing a similar but opposite change. Thus, the change in one pair is compensated by a change in the other pair to always produce the zero output. This completes a 180 degree portion of the cycle. The same occurs in the remainder of the cycle.

When the inputs to the transformers have a phase difference other than 90 degrees, signals are combined in the transformers to produce unequal voltage drops across resistors 124 and 126. These unequal voltages are added to produce the output voltage. This is shown in case 2, where the signals are supplied in phase to the transformers. At time 1 the positive input signals are coupled to terminals 154 and 156 of transformer 93. Terminals 150 and 152 of transformer 93 are at a relatively negative level. In the secondary of transformer 94 terminals 160 and 162, and 164 and 166 are connected in parallel. Therefore, relatively positive levels are coupled to the top winding of the secondary of transformer 93, while relatively negative voltages are connected to the lower winding of the secondary. The positive level supplied to the junction of resistors 132 and 134 combine with the positive level at terminal 154 to strongly reverse-bias diode 142. The positive level at the junction of the resistors also cancels the relatively negative level at terminal 150 so diode 140 does not conduct. However, the negative level supplied to the junction of resistors 136 and 138 is of the correct polarity to forward bias diodes 144 and 146. The relatively positive level from terminal 160 of the transformer 94 cancels this level and diode 146 does not conduct. The level from transformer 94 is added to the relatively negative level at terminal 152 of transformer 92 to strongly forward bias diode 144. The electron current flows through this diode and resistor 126. The return path for the current is supplied by the line connecting the junction of resistors 124 and 126 and resistors 128 and 130. In this case current flows only through resistor 126. Since no current flows through resistor 124 to cancel the voltage across resistor 126, the maximum output voltage is developed. At time 3, the negative signal from terminals 160 and 162 of transformer 94 is used to forward bias diode 142. The rest of the diodes are reverse biased, current flows through resistor 126 as in time 1, and the negative output is developed on this half cycle also. At time 2 the input signal is zero but capacitor 168 sustains the d-c level achieved at times 1 and 3. Slow varying d-c output from the clipper correlator is fed to a low-pass filter to increase the signal to noise ratio by eliminating extraneous noise.

In order to realize initial detection ranges in excess of 20,000 yards, the line hydrophone is on the order of 10 feet long and includes about 36 elements. Two operating frequency bands are advisable, namely, a low band (1–2.8 kilocycles/second) for maximum detection capability and a high frequency band (2.8–5.6 kilocycles/second) for improved angle resolution with small loss in maximum detection range.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. Passive underwater detection and ranging apparatus for forming two listening beams symmetrical about a horizontal plane and scanning in depression-elevation comprising,
   - a line hydrophone having a plurality of elements for independently sensing intercepted waterborne acoustic-energy at a plurality of vertically in-line equally spaced positions and for independently converting the respective intercepted acoustic energies within a selected frequency band into corresponding electrical signals,
   - a compensator plate having two contiguous sets of conductors in mirror-image in-line relationship and presenting a flat wiper surface, each set including straight parallel equal-width conductors insulated from each other, the number of conductors in each set being equal to the number of elements in the line hydrophone,
   - identical delay lines for each set, each delay line including one connection for each conductor in the respective set and coupled to the respective conductors, said delay lines affording equal time intervals between connections,
   - an assembly of in-line wiper contacts equal to the number of conductors of each set in the compensator plate, supported in wiping engagement with the wiper surface of the compensator plate and rotatable about an axis through the center of the assembly and through the center of the compensator plate,
   - the successive wiper contacts from one end of the assembly being coupled to respective successive elements of the line hydrophone,
   - a recorder having a paper transport for linearly moving the record paper at a slow constant rate, a writing element operable in response to electrical energy and means for reciprocating the writing element transverse to the motion of the paper,
   - two phase detector circuits, each being coupled to corresponding ends of the two delay lines,
   - means coupling the electrical outputs of the two phase detectors to the writing element of the recorder, and
   - motor drive means for moving the wiper contact assembly and the writing element in synchronism between their respective limits.

* * * * *